US007627752B2

(12) United States Patent
Sakaguchi

(10) Patent No.: US 7,627,752 B2
(45) Date of Patent: *Dec. 1, 2009

(54) COMMUNICATION SYSTEM AND NETWORK CONTROL APPARATUS WITH ENCRYPTION PROCESSING FUNCTION, AND COMMUNICATION CONTROL METHOD

(75) Inventor: Tadahiko Sakaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/862,551

(22) Filed: Sep. 27, 2007

(65) Prior Publication Data

US 2008/0022092 A1 Jan. 24, 2008

Related U.S. Application Data

(62) Division of application No. 10/337,866, filed on Jan. 8, 2003, now Pat. No. 7,296,148.

(30) Foreign Application Priority Data

Jan. 9, 2002 (JP) ............................. 2002-002704

(51) Int. Cl.
*H04L 9/00* (2006.01)
*G06F 15/16* (2006.01)
(52) U.S. Cl. .................. 713/160; 713/161; 709/236
(58) Field of Classification Search ......... 713/160–161; 709/236; 370/351, 395.52, 470–472, 475
See application file for complete search history.

(56) References Cited

U.S. PATENT DOCUMENTS 6,219,161 B1 * 4/2001 Chang et al. ............ 398/79
6,327,660 B1 12/2001 Patel 6,347,376 B1 2/2002 Attwood et al.

(Continued)

FOREIGN PATENT DOCUMENTS

JP 2001-298449 A 10/2001

(Continued)

OTHER PUBLICATIONS

IPsec Seminar Room (No. 2), IPsec Architecture, Computer and Network LAN, vol. 16, No. 9, Sep. 1, 1998, published by Ohmsha Ltd., p. 95-100.

(Continued)

*Primary Examiner*—Minh Dieu Nguyen
(74) *Attorney, Agent, or Firm*—Sughrue Mion, PLLC

(57) ABSTRACT

A communication system, which performs communication using a transmission packet encrypted by an IP-SEC encrypting method, includes a first encrypting circuit that encrypts a transmission packet by an IP-SEC encrypting method, a second encrypting circuit that encrypt header data to be used to decode the transmission packet encrypted by the first encrypting circuit, and a transmitting circuit that transmit the transmission packet whose header is encrypted by the second encrypting circuit. The communication system further includes a first decoding circuit that decode the authentication data of the reception packet using information to be used to decode the authentication data recorded in the IP-SEC header of the transmission packet and a second decoding circuit that decodes the reception packet using the authentication data decoded by the first decoding circuit.

7 Claims, 16 Drawing Sheets

U.S. PATENT DOCUMENTS

| | | | |
|---|---|---|---|
| 6,438,612 B1 | 8/2002 | Ylonen et al. | |
| 6,587,680 B1 * | 7/2003 | Ala-Laurila et al. | 455/411 |
| 6,904,466 B1 | 6/2005 | Ishiyama et al. | |
| 6,970,459 B1 * | 11/2005 | Meier | 370/389 |
| 6,996,842 B2 | 2/2006 | Strahm et al. | |
| 7,028,335 B1 | 4/2006 | Borella et al. | |
| 7,082,200 B2 * | 7/2006 | Aboba et al. | 380/273 |
| 7,143,282 B2 | 11/2006 | Takagi et al. | |
| 2002/0006133 A1 | 1/2002 | Kakemizu et al. | |
| 2002/0083046 A1 | 6/2002 | Yamauchi et al. | |
| 2002/0104020 A1 * | 8/2002 | Strahm et al. | 713/201 |
| 2002/0184487 A1 * | 12/2002 | Badamo et al. | 713/153 |
| 2003/0074388 A1 | 4/2003 | Pham et al. | |
| 2004/0193876 A1 | 9/2004 | Donley et al. | |

FOREIGN PATENT DOCUMENTS

| | | |
|---|---|---|
| JP | 2001-313679 A | 11/2001 |

OTHER PUBLICATIONS

Mastering IPsec, Oct. 25, 2001, published by O'Reilly Japan, Inc., p. 109-137.

Keromytis et al., "Implementing IP-SEC", Aug. 1, 1997, IEEE, pp. 1948-1952.

Perlman et al., "Key exchange in IPSEC: analysis of IKE", Nov.-Dec. 2000, IEEE Internet Computing, pp. 50-56.

* cited by examiner

COMMUNICATION SYSTEM AND NETWORK CONTROL APPARATUS WITH ENCRYPTION PROCESSING FUNCTION, AND COMMUNICATION CONTROL METHOD

BACKGROUND OF THE INVENTION

1. Field of the Invention

The present invention relates to a system and method that encrypt a packet to perform communication, and more particularly to a communication system and method that encrypt a packet using an IP-SEC encrypting method to perform communication, a Network control apparatus (such as LAN control apparatus) with an encryption processing function, and a communication control program.

2. Description of the Related Art

Conventionally, there is carried out communication in which a security function is added to a TCP/IP based on an IP-SEC (IP Security Protocol). A LAN (Local Area Network) control apparatus with the security functions based on the IP-SEC encrypts a packet to be sent to LAN from an upper apparatus such as a personal computer etc., based on an IP-SEC standard to transmit the encrypted packet, and decodes the encrypted packet received and transmits the decoded packet to the upper apparatus.

In recent years, the proportion of data encryption by software processing has increased. Also, the amount of using LAN network increases with the widespread use of server client apparatuses and the importance of data to be handled is improved. For this reason, a system having high reliability and faster processing speed is demanded.

However, in order to response to this demand, the prior art had the following problems.

First, the conventional LAN control apparatus had a problem that a large load was applied on the CPU at the time of encrypting and decoding processing and much time was required for the processing.

Secondly, in the conventional LAN control apparatus, transmission data from the upper apparatus is transmitted to a LAN interface based on the LAN standard. Regarding the packet subjected to IP-SEC encryption based on the IP-SEC standard, data for decoding data subjected to IP-SEC encryption is recorded as authentication data of an IP-SEC header for the transmission packet. As a result, the transmission packet sent to a LAN network via the LAN interface is stolen by a third person (an unauthorized user) and the IP-SEC encryption is decoded, causing a risk that important secret data is relatively easily leaked out.

The IP-SEC encryption technique is disclosed in, for example, Unexamined Japanese Patent Application KOKAI Publication No. 2001-313679 (which corresponds to the U.S. patent application Ser. No. 09/518,399) and Unexamined Japanese Patent Application KOKAI Publication No. 2001-298449. The disclosure of these publications is incorporated herein by reference.

SUMMARY OF THE INVENTION

A first object of the present invention is to provide a system and method that realize high reliability.

Moreover, a second object of the present invention is to make it impossible for a general apparatus, which is based on an IP-SEC standard, to decode a transmission packet and to prevent secret data from being leaked out.

A third object of the present invention is to provide a communication system and method that can highly secured transmission.

In order to attain the aforementioned objects, a communication system of a first aspect of the present invention that performs communication using a transmission packet encrypted by an IP-SEC encrypting method includes a first encrypting circuit that encrypts a transmission packet by an IP-SEC encrypting method. The communication system further includes second encrypting circuits that encrypt header data to be used to decode the transmission packet encrypted by the first encrypting circuit. The communication system further includes transmitting circuits that transmit the transmission packet whose header is encrypted by the second encrypting circuits.

For example, the header data is authentication data in an IP-SEC header of the transmission packet, and the second encrypting circuits encrypt authentication data.

The information to be used to decode encrypted authentication data may be recorded onto a predetermined unused portion of the IP-SEC header of the transmission packet. This information to be used to decode encrypted authentication data is recorded, for example, between a recording area of a payload length and a recording area of a security parameter index in the IP-SEC header of the transmission packet.

The communication system may further comprise: first decoding circuits that decode the authentication data of the reception packet using information to be used to decode the authentication data recorded in the IP-SEC header of the transmission packet; and a second decoding circuit that decodes the reception packet using the authentication data decoded by said first decoding circuits. A plurality of encryption keys, serving as information to be used to decode the authentication data, may be recorded in the IP-SEC header of the transmission packet. A flag that designates how each encryption key is used to decode the authentication data may be included in information to be used to decode the authentication data.

A part of the respective encryption keys to be used to decode the authentication data may be notified to a recipient's terminal from a sender's terminal for the transmission packet, and the authentication data of the received transmission packet may be decoded using the notified encryption key and other encryption keys recorded in the IP-SEC header of the received transmission packet at the recipient's terminal for the transmission packet.

Each of the encryption keys is formed of, for example, n-bit data. In this case, the second encrypting circuits may XOR (eXclusive OR) each n-bits of the authentication data with each encryption key sequentially to encrypt the authentication data, and said first decoding circuits may XOR each n-bits of the authentication data of the encrypted transmission packet received with each encryption key to decode the authentication data. Or, the second encrypting circuits may XOR each k.n bits of the authentication data with k.n-bits data obtained by combining k encryption keys sequentially to encrypt the authentication data, and said first decoding circuits may XOR each k.n bits of the authentication data of the received transmission packet with k.n-bits data obtained by combining k encryption keys sequentially to decode the authentication data.

In the communication system, for example, at a LAN control apparatus of a sender's terminal for the transmission packet, IP-SEC encryption of the transmission packet and encryption of the header data of the transmission packet subjected to IP-SEC encryption are performed, and at a LAN control apparatus of a recipient's terminal for the transmission packet, decoding of the header data of the received transmission packet and IP-SEC encryption of the transmission packet are performed using the decoded header data.

In order to attain the aforementioned objects, a network control apparatus of a second aspect of the present invention comprises:

first encrypting means for receiving a transmitting packet from an upper apparatus to perform IP-SEC encryption on the transmitting packet; and second encrypting means for encrypting header data that is used to decode the transmission packet subjected to IP-SEC encryption and is generated at an IP-SEC encrypting time in a predetermined method.

The network control apparatus may further comprises:

first decoding means for decoding the authentication data of the reception packet using information to be used to decode the authentication data recorded in the IP-SEC header of the transmission packet; and second decoding means for decoding the reception packet using the authentication data decoded by said first decoding circuits.

In order to attain the aforementioned objects, a communication method of a third aspect of the present invention comprises the steps of:

encrypting a transmission packet by an IP-SEC encrypting method;

encrypting header data to be used to decode the transmission packet encrypted; and transmitting the transmission packet whose header is encrypted.

The communication method may further comprising the steps of:

receiving a transmission packet;

decoding the authentication data of the reception packet using information to be used to decode the authentication data recorded in the IP-SEC header of the transmission packet; and decoding the reception packet using the authentication data decoded by said first decoding circuits.

The system, apparatus and method are realized by a computer which runs in accordance with a computer program or a data signal representing the computer program embodied in a carrier wave. The computer program are stored in, for example, any recording medium such as a CD-ROM, a harddesk, and so on. The data signal can be transmitted over a network by, for example, modulating a carrier wave by the data signal.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

The following will specifically explain embodiments of the present invention with reference to drawings accompanying herewith.

Figure 1:
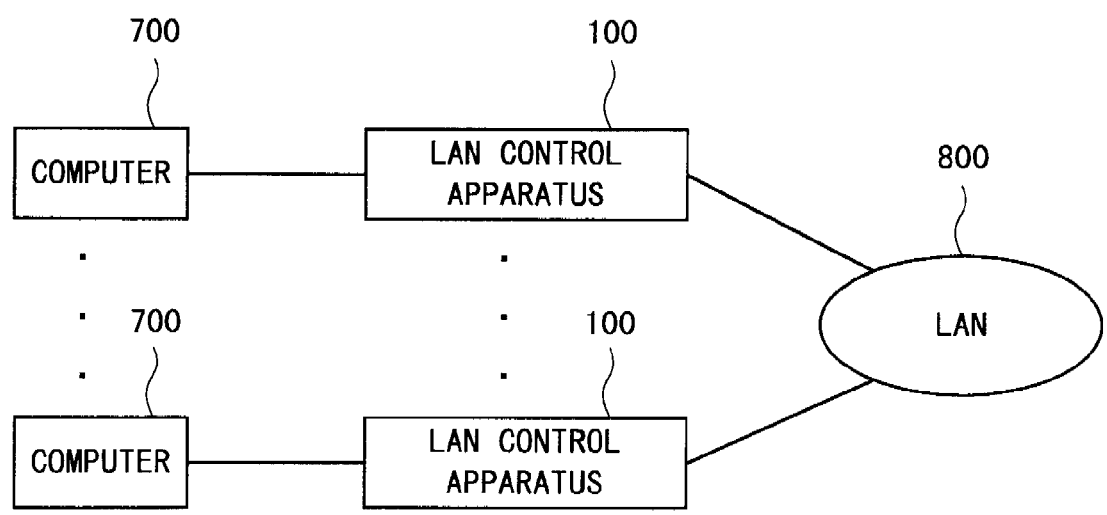
FIG. 1 is a block diagram illustrating a configuration of a LAN control system with an encryption processing function according to a first embodiment of the present invention.

As shown in FIG. 1, in a communication system of the present invention, a LAN control apparatus 100 causes a computer 700, which is an upper apparatus, to be connected to a LAN 800 to perform communication.

As the computer 700, which is the upper apparatus, for example, a personal computer, etc., can be used.

The LAN control apparatus 100 includes a communication function using an IP-SEC encrypting method. The LAN control apparatus 100 performs IP-SEC encryption on a transmission packet to be transmitted from the upper apparatus, and sends the encrypted transmission packet to a LAN 800, and decodes the encrypted packet received and transmits the decoded packet to the upper apparatus.

Figure 2:
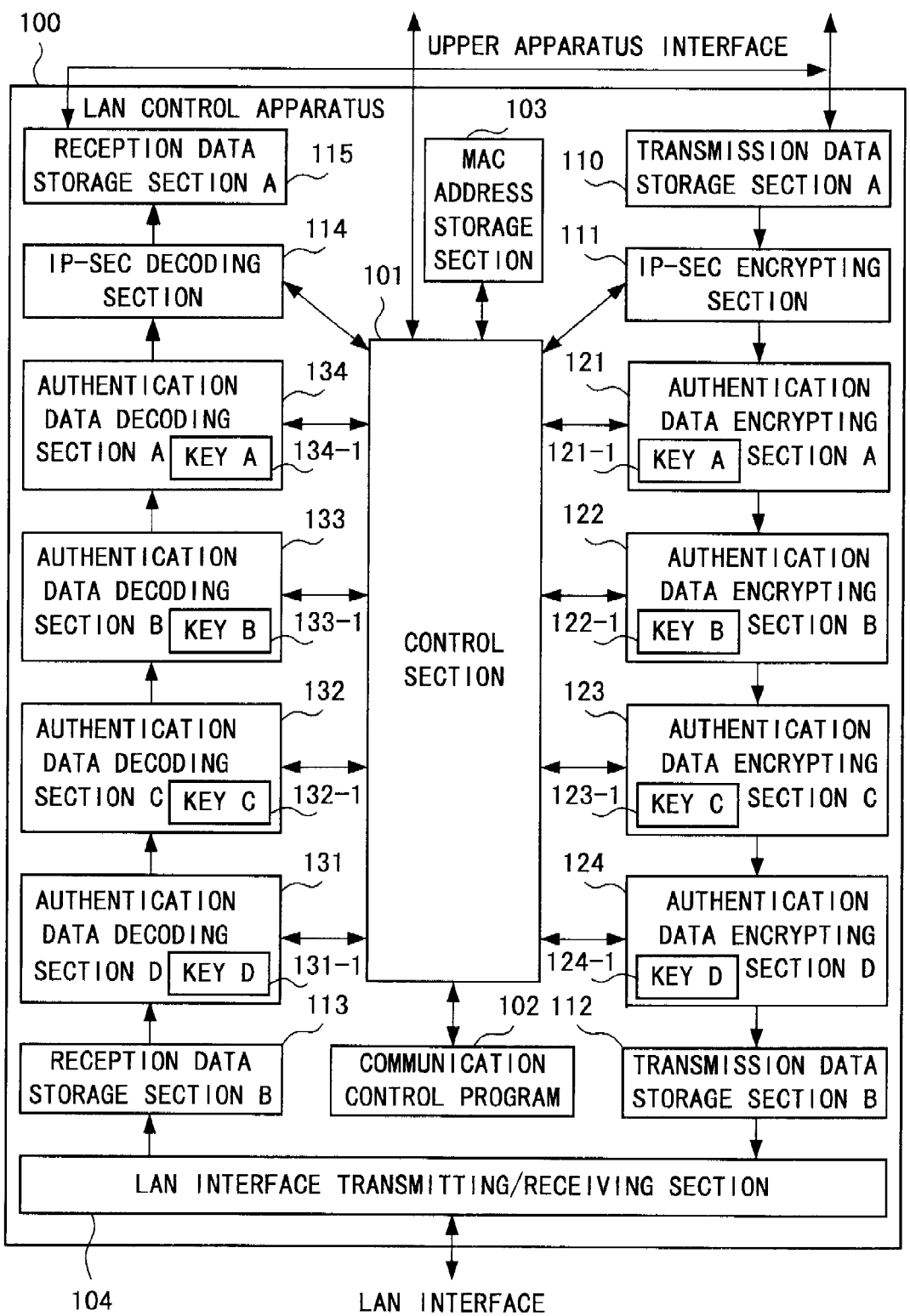
FIG. 2 is a block diagram illustrating a configuration of a communication system according to the first embodiment of the present invention.

The LAN control apparatus 100, as shown in FIG. 2, includes a control section 101, a communication control program 102, a MAC (Media Access Control) address storage section 103, a LAN interface transmitting/receiving section 104, a transmission data storage section A 110, an IP-SEC encrypting section 111, a transmission data storage section B 112, a reception data storage section B 113, an IP-SEC decoding section 114, a reception data storage section A 115, authentication data encrypting sections A 121, B 122, C 123, D 124, and authentication data decoding sections D 131, C 132, B 133, and A 134.

The control section 101 comprises a CPU (Central Processing Unit) that is subjected to program control, and controls the respective components of the LAN control apparatus 100.

The communication control program 102 is a computer program including a function of controlling processing of the LAN control apparatus 100. The communication control program 102 is stored in a magnetic disk, a semiconductor memory, or other storage medium. The communication control program 102 is loaded onto the control section 101 from the storage medium and realizes the respective functions by controlling the operation.

The MAC address storage section 103 stores a MAC address of the LAN control apparatus 100.

The LAN interface transmitting/receiving section 104 performs transmission/reception of the packet via the LAN 800.

The transmission data storage section A 110 stores the transmission packet sent from the upper apparatus, and transmits it to the IP-SEC encrypting section 111.

The IP-SEC encrypting section 111 performs IP-SEC encryption on the transmission packet.

Regarding the transmission packet subjected to IP-SEC encryption, the respective authentication data encrypting sections A 121, B 122, C 123, D 124 encrypt authentication data of the IP-SEC header using encryption keys A 121-1, B 122-1, C 123-1, and D 124-1, respectively. The details on the encrypting process will be described later.

The transmission packet subjected to IP-SEC encryption to encrypt authentication data of the IP-SEC header is stored in the transmission data storage section B 112, and is transmitted onto the LAN 800 from the LAN interface transmitting/ receiving section 104.

Moreover, the LAN interface transmitting/receiving section 104 receives the packet subjected to the above encryption from the LAN 800, and stores it to the reception data storage section B 113. The authentication data decoding sections D 131, C 132, B 133, and A 134 decode authentication data of the IP-SEC header for the packet stored in the received data storage section B 113 using encryption keys A, B, C, and D according to control of the control section 101, respectively.

Then, the IP-SEC decoding section 114 decodes IP-SEC encoded data for the packet using the decoded authentication data. The decoded packet is stored in the reception data storage section A 115, and is sent to the upper apparatus.

Figure 3:
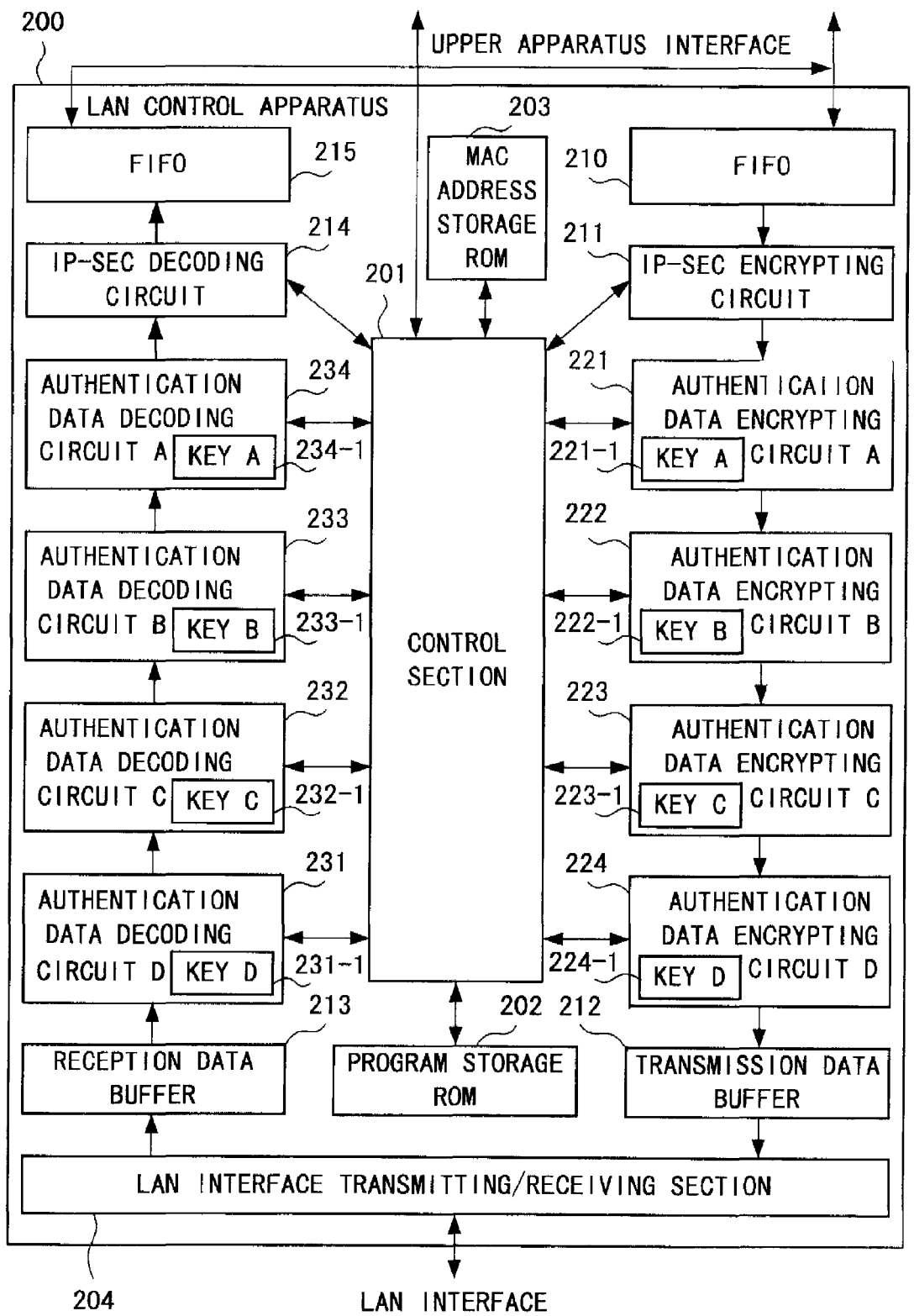
FIG. 3 is a block diagram illustrating a configuration of one embodiment of the LAN control system with an encryption processing function according to the first embodiment of the present invention.
Figure 4:
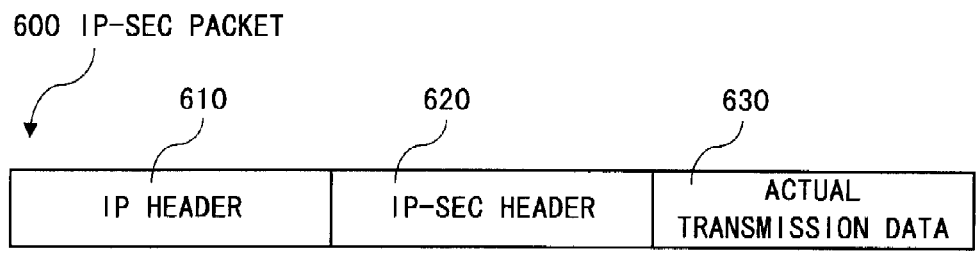
FIG. 4 is a view illustrating a data structure of an IP-SEC packet according to the first embodiment of the present invention.

FIG. 3 is a block diagram illustrating a first example of the specific configuration of a LAN control apparatus 200 with an encryption processing function according to one embodiment of the present invention.

Moreover, FIGS. 4 to 7 are views each illustrating a data structure of an IP-SEC packet (transmission packet) 600 according to the present embodiment. FIGS. 9 to 12 are views each specifically illustrating an IP-SEC header 620 in an encryption processing of this embodiment. FIGS. 14 to 17 are views each specifically illustrating the IP-SEC header 620 in a decode processing of this embodiment.

First of all, the function of each component of the embodiment of FIG. 3 will be explained.

A FIFO (First In First Out) memory 215 temporarily stores data, which is obtained by decoding data received from the LAN interface using various kinds of decoding circuits, in order to transmit such data to the upper apparatus. The FIFO memory 215 checks an interface idle time of the upper apparatus, and transmits data to the upper apparatus.

A FIFO memory 210 temporarily stores transmission data, which was sent from the upper apparatus and which is to be sent to the LAN interface. The FIFO memory 210 transmits data according to a request from an IP-SEC encrypting circuit 211.

A MAC address storage ROM 203 is a memory that stores a MAC address of the LAN control apparatus 200. The MAC address storage ROM 203 transmits the stored MAC address according to a reading request from a control section 201.

The IP-SEC encrypting circuit 211 encrypts transmission data received via the FIFO memory 210 based on an IP-SEC procedure and transmits the encrypted data to a next authentication data encrypting circuit A 221.

The authentication data encrypting circuit A 221 receives the encrypted data sent from the IP-SEC encrypting circuit 211. The authentication data encrypting circuit A 221 checks an encryption flag that is provided in an unused portion (undefined portion) of the IP-SEC header of encrypted data received. Then, when determining that encryption processing of the circuit itself is necessary, the authentication data encrypting circuit A 221 performs XOR (eXclusive OR, exclusive disjunction, EX-OR) operation between an encryption key A and authentication data in the IP-SEC header. The authentication data encrypting circuit A 221 sets a result of the XOR operation to an IP-SEC header, and sends encrypted data to an authentication data encrypting circuit B 222. In addition, the encryption key A is set by the control section 201.

Authentication data encrypting circuits B 222 to D 224 check whether or not their encryption processing is necessary, similar to the aforementioned authentication data encrypting circuit A 221. When determining that their encryption processing is necessary, the authentication data encrypting circuits B 222 to D 224 encrypt authentication data based on the encryption key allocated to the respective circuits, and transfers processed data to a next processing circuit.

A transmission data buffer 212 is a buffer that stores encrypted transmission data from the authentication data encrypting circuit D 224 and that transmits stored data according to a request from a LAN interface transmitting/ receiving section 204. For example, the transmission data buffer 212 stores transmission data on a frame basis and transmits such data.

A reception data buffer 213 stores encrypted reception data sent from the LAN interface transmitting/receiving section 204, and transmits such data to an authentication data decoding circuit D 231. For example, the reception data buffer 213 stores reception data on a frame basis and transmits such data.

The control section 201 controls the entire LAN control apparatus 200.

The control section 201 receives in advance four kinds of keys for encrypting authentication data sent from the upper apparatus prior to encrypting transmission data to the LAN interface. Then, the control section 201 stores these encryption keys to key sections (221-1 to 224-1) of authentication data encrypting circuits A 221 to D 224 that need processing, respectively.

The control section 201 instructs the IP-SEC encrypting circuit 211 to store keys for encrypting various kinds of authentication data (encryption keys) and a flag indicating a kind of encryption to a predetermined unused portion of the IP-SEC header.

Moreover, regarding the decoding of data received from the LAN interface, a decoding key D for an authentication data decoding circuit D 231 sent from software is determined in a similar fashion (in this case, the key D is controlled by software to keep the sameness as in the case of the encrypting time).

A program storage ROM 202 is a memory that stores a control program of the control section 201 of the LAN control apparatus 200.

The LAN interface transmitting/receiving section 204 reads data to be transmitted to the LAN interface from the transmission data buffer 212 and transmits such data. Also, the LAN interface transmitting/receiving section 204 sends data received from the LAN interface to the reception data buffer 213. The LAN interface transmitting/receiving section 204 performs transmission/reception of data between the transmission data buffer 212 and reception data buffer 213 on a frame basis.

An IP-SEC decoding circuit 214 runs (executes) such processing that decodes data encrypted by the standard IP-SEC function to return to data, which is not subjected to encryption.

Each of authentication data decoding circuits A 234 to D 231 includes functions of analyzing a flag of received data in the IP-SEC head, fetching an authentication data decoding key for each circuit to store to a predetermined key storing section A 234-1 to D 231-1, and executing decoding (exclusive OR) by a predetermined procedure based on the key when determining that each circuit must perform processing.

Since the IP-SEC encrypting circuit 211 and IP-SEC decoding circuit 214 of FIG. 3 are well known to one skilled in the art, the specific explanation of the structure is omitted.

The IP-SEC packet 600 of this embodiment includes an IP header 610, an IP-SEC header 620, and actual transmission data 630. The IP header 610 is a header that is generated by the upper apparatus (computer 700), and is added when a packet is generated. The IP-SEC header 620 is a header that is generated when IP-SEC encryption is performed on the packet, and information that is used in decoding is recorded thereon. Moreover, actual transmission data 630 is data encrypted in IP-SEC encrypting processing and not subjected to authentication data encryption of this embodiment.

Figure 5:
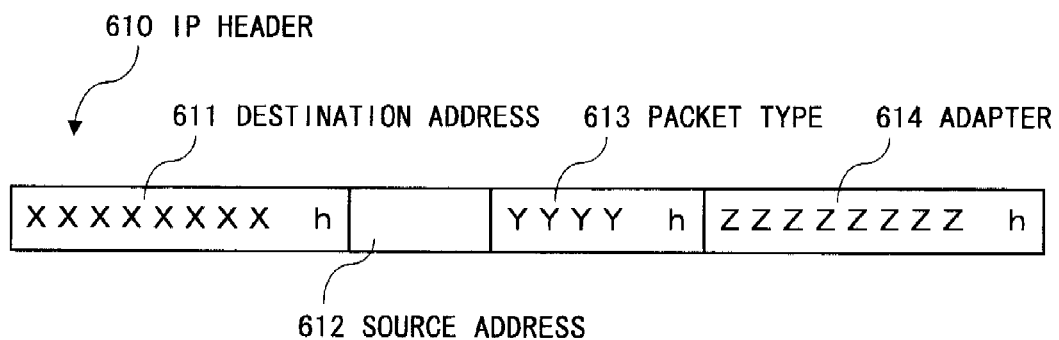
FIG. 5 is a view illustrating a data structure of an IP header of an IP-SEC packet according to the first embodiment of the present invention.

As shown in FIG. 5, the IP header 610 includes a destination address 611, a source address 612, packet type information 613, and an adapter ID 614.

Figure 6:
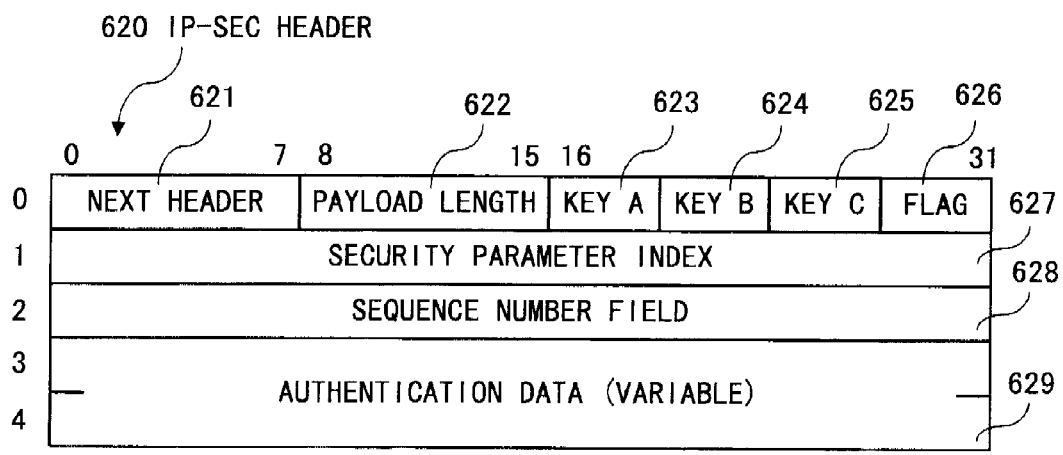
FIG. 6 is a view illustrating a data structure of an IP-SEC header of the IP-SEC packet according to the first embodiment of the present invention.

As shown in FIG. 6, the IP-SEC header 620 includes next header position information 621, which indicates a next header position, payload length information 622, which indicates a length of a payload, a key A 623, which is an encryption key, a key B 624, a key C 625, a flag 626, a security parameter index (SPI) 627, a sequence number field 628, and authentication data 629.

Authentication data 629 is used to decode data subjected to IP-SEC encryption in actual transmission data 630 of the IP-SEC packet 600. The LAN control apparatus 200 of this embodiment encrypts authentication data 629 and transmits it to the IP-SEC packet 600.

Figure 24:
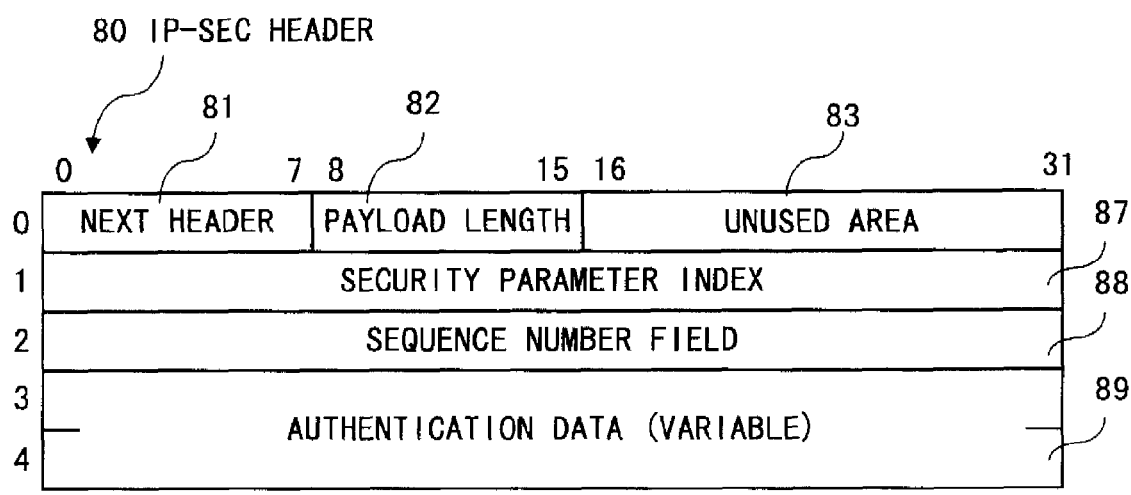
FIG. 24 is a view a structure of a conventional IP-SEC header.

The IP-SEC header 620 of this embodiment has a configuration that three encryption keys (key A 623, key B 624, key C 625) to be used to decode authentication data 629 and a flag 626, which shows how authentication data is decoded using the respective encryption keys, are recorded on an unused area 83 positioned between a recording area of a payload length of a conventional IP-SEC header 80 shown in FIG. 24 and a recording area of a security parameter index (SPI).

The unused area 83 of the conventional IP-SEC header 80 is 16 bits (2 bytes) and each length of the encryption keys A 623, B 624, C 625 and flag 626 is 4 bits.

The encryption key D is neither recorded on the IP-SEC header 620 and nor notified to a transmission destination. Namely, the encryption key D is separately notified to the LAN control apparatus 200 for a recipient from the LAN control apparatus 200 for a sender via LAN 800 etc. Then, the encryption key D is used to decode authentication data at the LAN control apparatus 200 according to an instruction from the upper apparatus.

Figure 7:
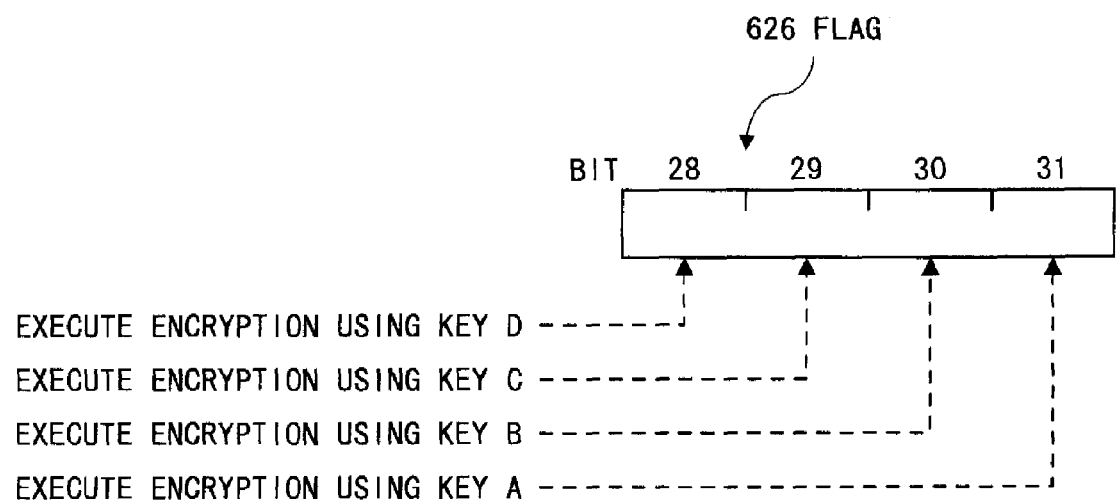
FIG. 7 is a view illustrating a data structure of a flag of the IP-SEC header according to the first embodiment of the present invention.
Figure 8:
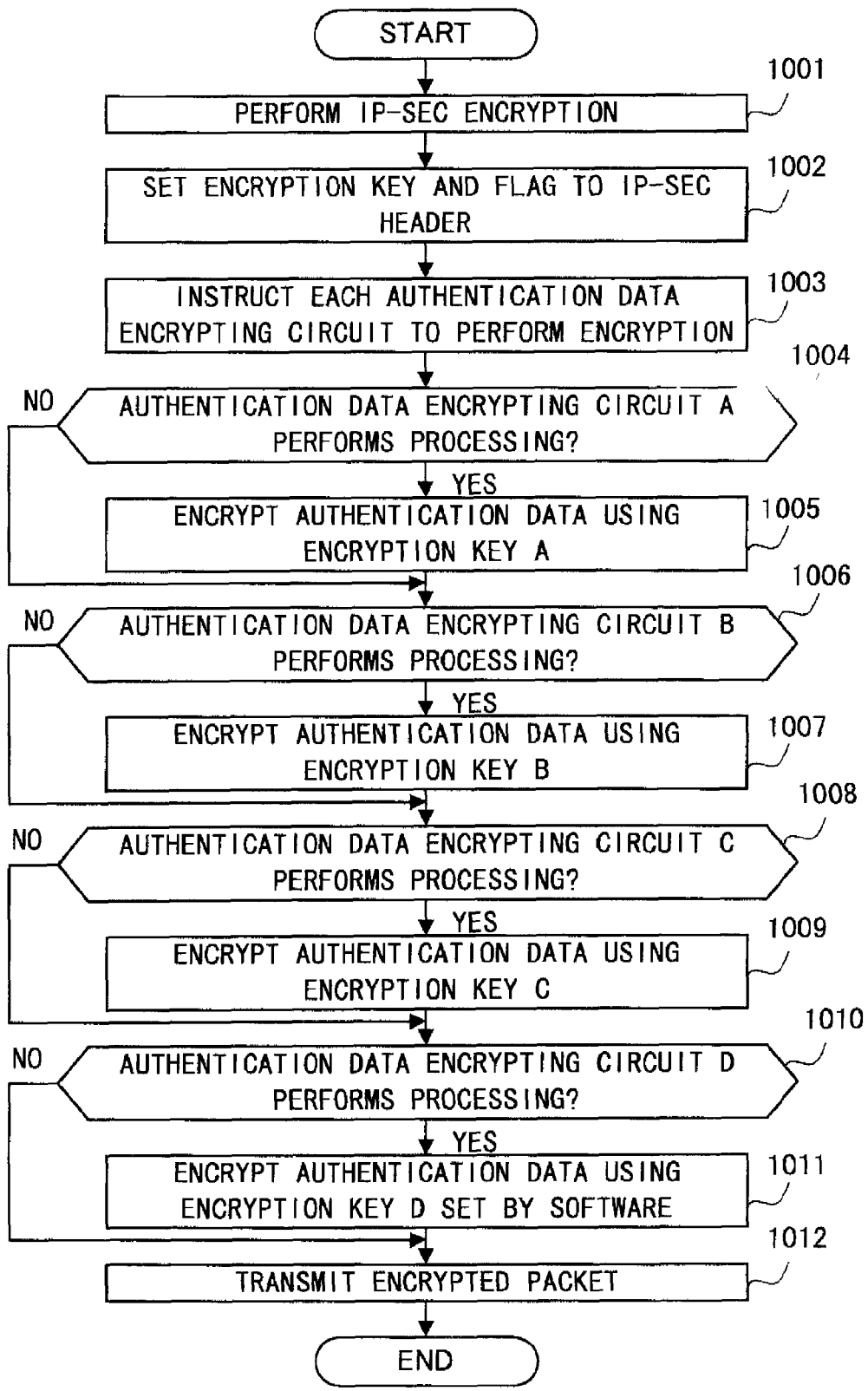
FIG. 8 is a flowchart explaining an operation of a packet transmission according to the first embodiment of the present invention.

The flag 626 of the IP-SEC header 620 has a 4-bit configuration, and keys D to A are allocated to the respective bits as shown in FIG. 7. The LAN control apparatus 200 decodes and encrypts authentication data using encryption keys (key A/key B/key C/key D) designated by this flag 626 (a value of designated bit is "1").

Thus, the LAN control apparatus 200 encrypts authentication data 629 in the IP-SEC header 620 for a transmission packet using the respective authentication data encrypting circuits A 221 to D 224. Then, the LAN control apparatus 200 decodes authentication data 629 in the IP-SEC header 620 for a reception packet using the respective authentication data decoding circuits A 234 to D 231. The LAN control apparatus 200 decodes authentication data 629 using an encryption key that is designated by the flag 626 in four encryption keys including three kinds of encryption keys (key A/key B/key C) of the IP-SEC header 620 and the key D separately notified.

Even if a third person (an unauthorized user) obtains the IP-SEC packet, or transmission packet 600 sent to a LAN 800, authentication data 629, which is an encryption parameter necessary for decoding data, is encrypted. For this reason, the LAN control apparatus corresponding to only the conventional IP-SEC cannot decode this data.

Moreover, by adopting a method in which the encryption key D is set to the LAN control apparatus 200 from the upper apparatus without being included in the packet, it is possible to prevent unauthorized decoding and to attain highly secured communication even though the third person (an unauthorized user) possesses the LAN control apparatus 200 of the present embodiment.

The following will explain an operation of the present embodiment. First of all, an explanation will be given of an operation of encryption processing with reference to a flowchart of FIG. 8 and FIGS. 9 to 12.

Figure 9:
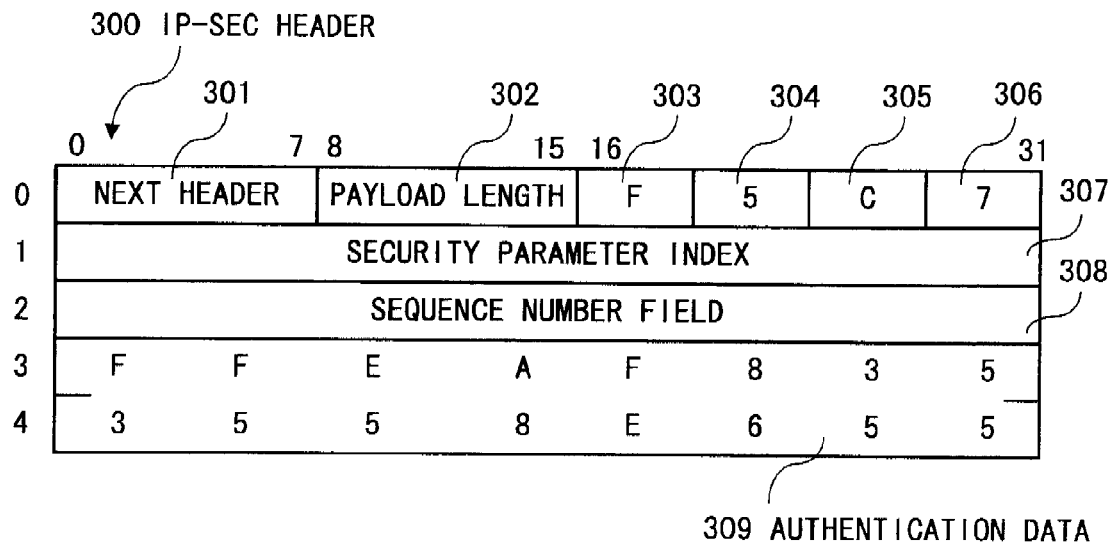
FIG. 9 is a view illustrating one example of a structure of the IP-SEC header before encrypting according to the first embodiment of the present invention.

An explanation will be first given of processing for encrypting authentication data 309 of an IP-SEC header 300 shown in FIG. 9.

The upper apparatus notifies the control section 201 of a transmission request and authentication data encryption keys (A, B, C, D) when transmitting data onto the LAN via the LAN interface. In response to this notification, the control section 201 notifies the IP-SEC encrypting circuit 211 of flag information indicating the encryption keys and types of encryption to be stored at predetermined positions of bits 16 to 31 of the IP-SEC header 300.

In an example of FIG. 9, the control section 201 notifies the IP-SEC encrypting circuit 211 of information that "F", "5", "C", and "7 (0111hx)" are stored to a key A portion 303, a key B portion 304, a key C portion 305, and a flag portion 306, respectively (information indicating that encryption keys A, B, C are respectively valid as shown in FIG. 7).

The IP-SEC encrypting circuit 211 that has received this notification executes encryption processing based on a predetermined procedure (step 1001). Thereafter, the IP-SEC encrypting circuit 211 stores this notification information at predetermined positions of bits 16 to 31 of the IP-SEC header (step 1002), and transmits this transmitting information to the authentication data encrypting circuit A 221.

Moreover, the control section 201 sets the encryption key for authentication data encrypting circuit A 221, the encryption key for authentication data encrypting circuit B 222 and the encryption key for authentication data encrypting circuit C 223 to "F" for key A, "5" for key B, and "C" for key C, respectively (step 1003).

After that, among the respective authentication data encrypting circuits A 221 to D 224, each circuit to which processing is instructed from the control section 201 encrypts authentication data using each encryption key (steps 1004 to 1011).

More specifically, the authentication data encrypting circuit A 221 receives an encrypted transmission packet from the IP-SEC encrypting circuit 211, and determines that bit 31 of the IP-SEC header 300 in the same transmission packet is valid (1). The authentication data encrypting circuit A 221 encrypts authentication data 309 according to this determination (steps 1004, 1005).

In this example, it is assumed that, the authentication data encrypting circuit A 221 XORs "FFEAF8353558E655" of authentication data 309 with all "F" every 4 bits (namely, an XOR with "FFFFFFFFFFFFFFFF" is executed). The authentication data encrypting circuit A 221 sends a value of "001507CACAA719AA" obtained thereby to the authentication data encrypting circuit B 222.

Next, the authentication data encrypting circuit B 222 receives encrypted transmission data from the authentication data encrypting circuit A 221, and determines that bit 30 of the IP-SEC header in the same data is valid (1). The authentication data encrypting circuit B 222 XORs "001507CACAA719AA" of authentication data 309 in the data with all "5" every 4 bits according to this determination. In other words, an XOR with "5555555555555555" is executed (steps 1006 and 1007). The authentication data encrypting circuit B 222 sends a value of "5540529F9FFF24CFF" obtained thereby to the authentication data encrypting circuit C 223.

After that, the authentication data encrypting circuit C 223 receives encrypted transmission data from the authentication data encrypting circuit B 222, and determines that bit 29 of the IP-SEC header in the same data is valid (1). The authentication data encrypting circuit C 223 XORs authentication data 309 in the data with all "C" every 4 bits according to this determination. The authentication data encrypting circuit C 223 sends a value of "998C9E53533E8033" obtained thereby to the authentication data encrypting circuit D 224 (steps 1008 and 1009).

Next, the authentication data encrypting circuit D 224 that has received the aforementioned encrypted transmission data from the authentication data encrypting circuit C 223, transmits the same data to the transmission data buffer 212 since it receives no instruction to encrypt from the control section 201 (step 1010).

Figure 10:
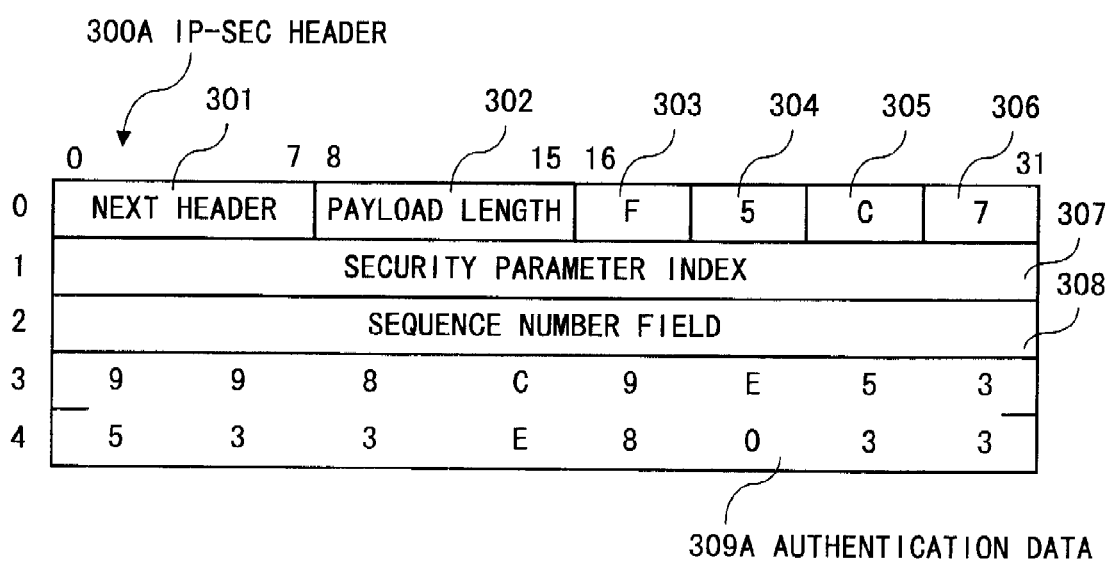
FIG. 10 is a view illustrating one example of the structure of the IP-SEC header after encrypting according to the first embodiment of the present invention.

Encrypted data thus generated (the details on the IP-SEC header 300A in which authentication data has been encrypted is shown in FIG. 10) is transmitted to the LAN interface via the LAN interface transmitting/receiving section 204 based on a predetermined procedure.

Since this encrypted authentication data 309A is completely different from authentication data 309, which is not subjected to encryption, this IP-SEC packet cannot be decoded by an apparatus having a standard IP-SEC function.

Similarly, an explanation will be given of the operations when authentication data encrypting circuits A 221 and D 224 are employed as circuits to be used. In this case, a value of the flag is "9 (1001hx)" as shown in an IP-SEC header 400 of FIG. 11.

The control section 201 transmits key A data and a flag indicating a kind of encryption to the IP-SEC encrypting circuit 211. Then, the control section 201 sets "F" and "EE" to the encryption key A for the authentication data encrypting circuit A 221 and the encryption key D for the authentication data encrypting circuit D 224, respectively (steps 1001, 1002). The value of the encryption key D is a value that is instructed from the upper apparatus and is not shown in the IP-SEC header 400.

Figure 11:
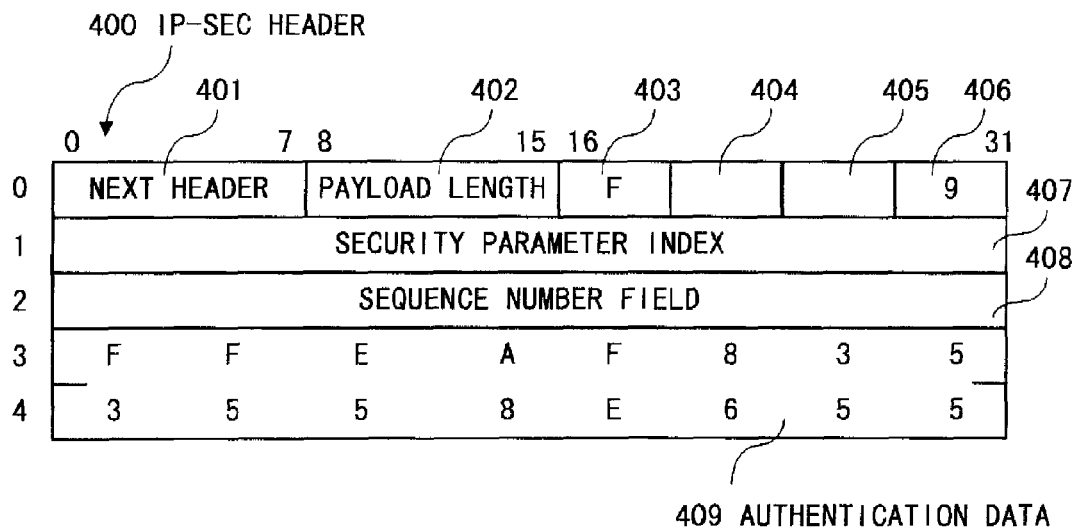
FIG. 11 is a view illustrating one example of a structure of the IP-SEC header before encrypting according to the first embodiment of the present invention.

By information sent from the control section 201, the IP-SEC encrypting circuit 211 sets "F", which is the value of the key A, and "9", which is the value of the flag, to predetermined areas (403, 406) in the IP-SEC header 400 of FIG. 11 (step 1003).

The authentication data encrypting circuit A 221 that has received data subjected to this set IP-SEC encryption determines that bit 31 of the IP-SEC header in the same data is valid (1). The authentication data encrypting circuit A 221 XORs "FFEAF8353558E655" of authentication data 409 in the same data with all "F" every 4 bits according to this determination. The authentication data encrypting circuit A 221 sends a value of "001507CACAA719AA" obtained thereby to the authentication data encrypting circuit B 222.

The authentication data encrypting circuit B 222 receives aforementioned encrypted transmission data from the authentication data encrypting circuit A 221. The authentication data encrypting circuit B 222 determines that bit 30 of the IP-SEC header is invalid (0). The authentication data encrypting circuit B 222 directly transmits the same data to the authentication data encrypting circuit C 223 according to this determination (step 1006).

The authentication data encrypting circuit C 223 receives aforementioned encrypted transmission data from the authentication data encrypting circuit B 222. The authentication data encrypting circuit C 223 determines that bit 29 of the IP-SEC header is invalid (0). The authentication data encrypting circuit C 223 directly transmits the same data to the authentication data encrypting circuit D 224 according to this determination (step 1008).

The authentication data encrypting circuit D 224 receives aforementioned encrypted transmission data from the authentication data encrypting circuit C 223. The authentication data encrypting circuit D 224 determines that bit 28 of the IP-SEC header is invalid (1). The authentication data encrypting circuit D 224 XORs "001507CACAA719AA" of an authentication data portion in the IP-SEC header with all "E" every 4 bits according to this determination (namely, all "EE" every 8 bits). The authentication data encrypting circuit D 224 sets a value of "EEFBE9242449F744" obtained thereby to authentication data 409, and sends transmitting data to the transmission data buffer 212.

Figure 12:
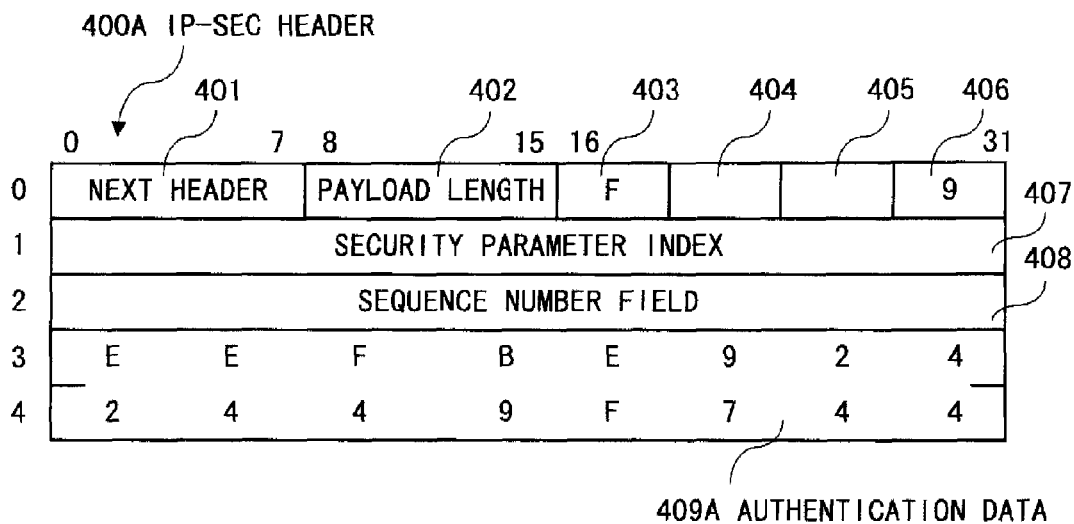
FIG. 12 is a view illustrating one example of the structure of the IP-SEC header after encrypting according to the first embodiment of the present invention.
Figure 13:
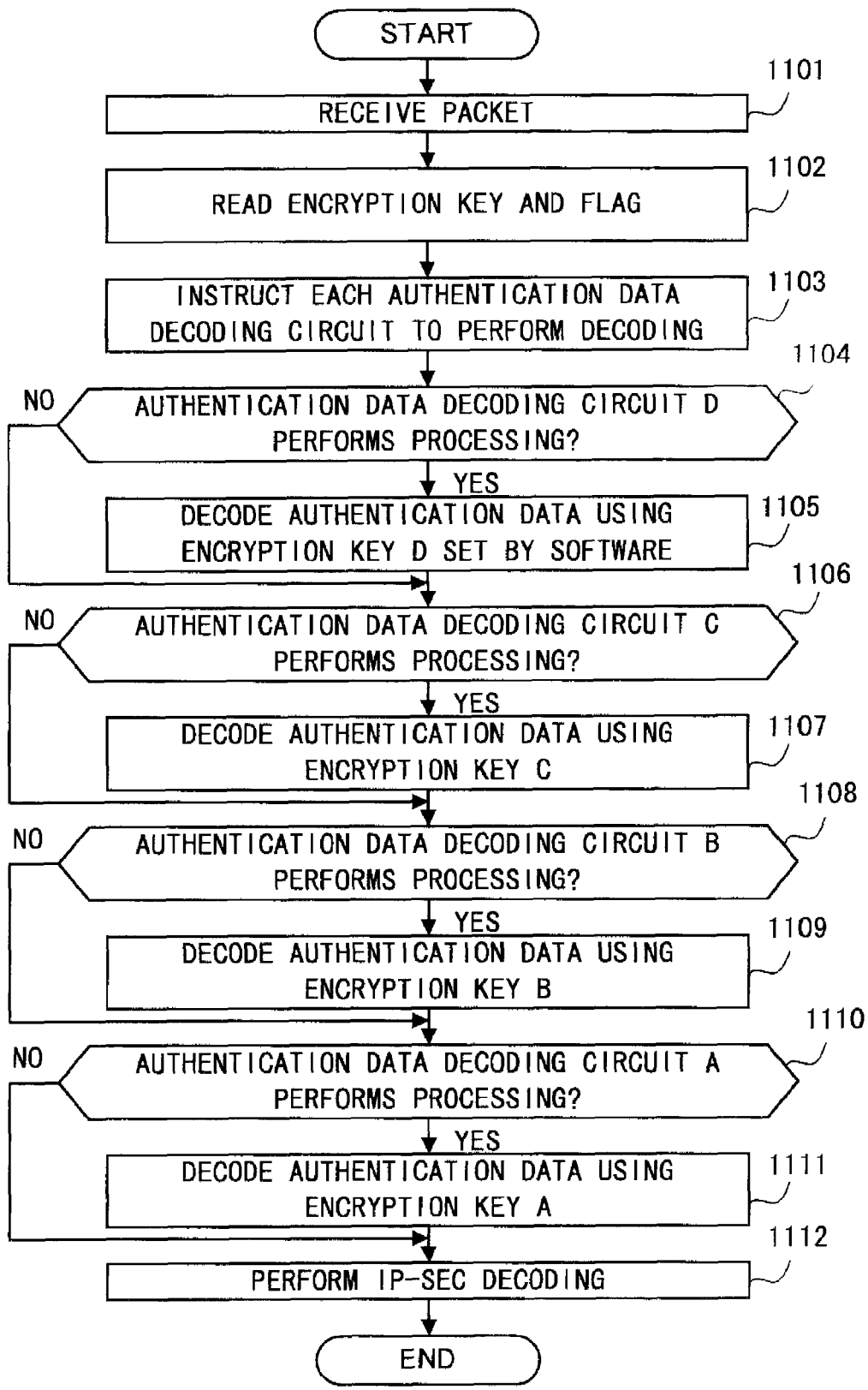
FIG. 13 is a flowchart explaining an operation of a packet reception according to the first embodiment of the present invention.

Encrypted data thus generated (the details on the IP-SEC header 400A in which authentication data has been encrypted is shown in FIG. 12) is transmitted to the LAN interface via the LAN interface transmitting/receiving section 204 based on a predetermined procedure.

While, decoding data received from the LAN interface will be explained with reference to a flowchart of FIG. 13 and FIGS. 14 to 17.

Figure 14:
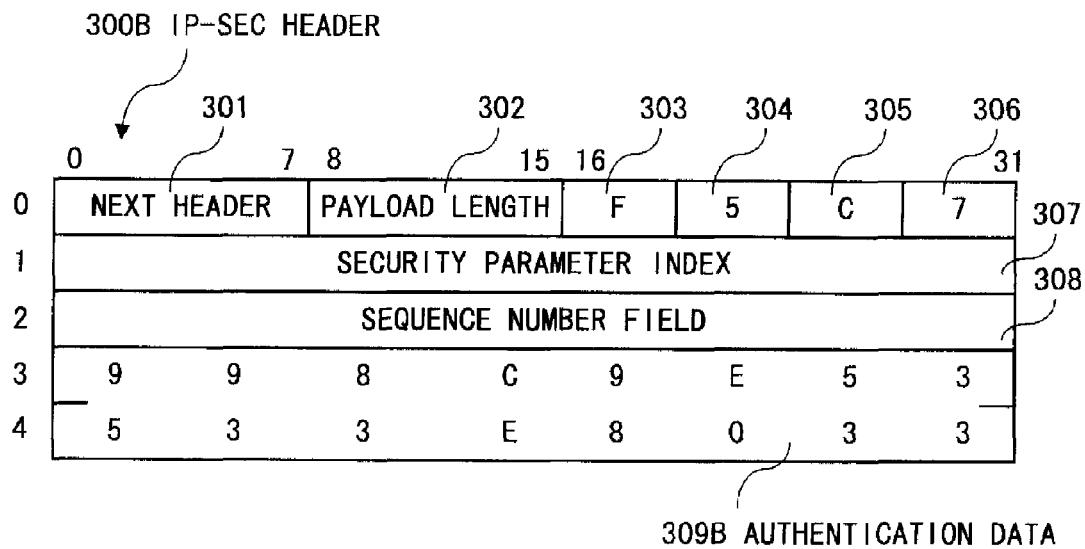
FIG. 14 is a view illustrating one example of a structure of the IP-SEC header before decoding according to the first embodiment of the present invention.

An explanation will be first given of an operation when the received packet has an IP-SEC header 300B shown in FIG. 14. This can be compared with examples of FIGS. 9 and 10 at an encrypting time.

Encrypted data received by the LAN interface transmitting/receiving section 204 is stored to the reception data buffer 213, and transmitted to the authentication data decoding circuit D 231 (steps 1101 to 1103).

The authentication data decoding circuit D 231 determines that bit 28 of a flag 306 for encrypting authentication data of the IP-SEC header 300B in the data received from the reception data buffer 213 is invalid (0). The authentication data encrypting circuit D 231 sends this data to a next authentication data decoding circuit C 232 without executing processing for decoding authentication data 309B according to this determination (step S1104).

The authentication data decoding circuit C 232 receives reception data from the authentication data decoding circuit D 231 and determines that bit 29 of the IP-SEC header in the same data is valid (1). The authentication data decoding circuit C 232 decodes authentication data 309B using the value "C" of the key C set in the key C portion 305 according to this determination (steps S1106, 1107). Namely, the authentication data decoding circuit C 232 XORs each 4 bits of "998C9E53533E8033" of authentication data 309B with "C." Then, the authentication data decoding circuit C 232 sets "5540529F9FF24CFF" obtained thereby to authentication data 309B. Sequentially, the authentication data decoding circuit C 232 transmits the reception packet to the authentication data decoding circuit B 233.

The authentication data decoding circuit B 233 receives the reception packet from the authentication data decoding circuit C 232 and determines that bit 30 of the IP-SEC header in the reception packet is valid (1). The authentication data decoding circuit B 233 XORs each 4 bits of authentication data in the reception packet with the value "5" of the key B according to this determination. The authentication data decoding circuit B 233 sets "001507CACAA719AA" obtained thereby to authentication data 309B of the IP-SEC header. Then, the authentication data decoding circuit B 233 transmits the reception packet in which authentication data is updated to the authentication data decoding circuit A 234 (steps 1108, 1109).

The authentication data decoding circuit A 234 receives the reception packet from the authentication data decoding circuit B 233. The authentication data decoding circuit A 234 determines that bit 31 of the IP-SEC header in the reception packet is valid (1). The authentication data decoding circuit A 234 XORs each 4 bits of authentication data in the reception packet with the value "5" of the key B according to this determination.

The authentication data decoding circuit A 234 sets "FFEAF8353558E655" obtained thereby to authentication data 309 of the reception packet. Then, the authentication data decoding circuit A 234 transmits the reception packet in which authentication data is updated to the IP-SEC decoding circuit A 214 (steps 1110, 1111).

Figure 15:
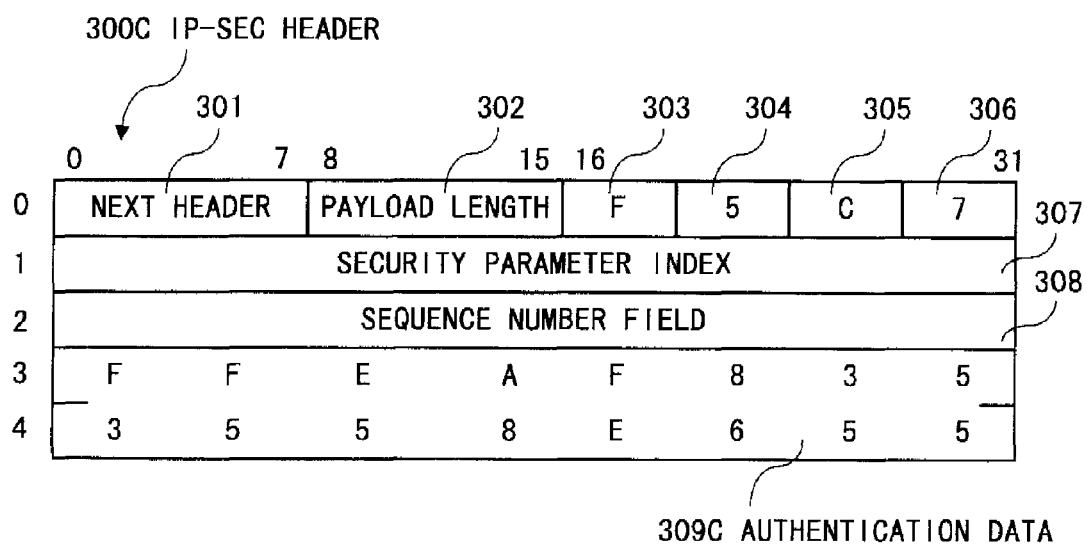
FIG. 15 is a view illustrating one example of a structure of the IP-SEC header after decoding according to the first embodiment of the present invention.

The IP-SEC decoding circuit A 214 receives the reception packet in which authentication data is thus decoded (the details on the IP-SEC header 300C in which authentication data has been decoded is shown in FIG. 15). The IP-SEC decoding circuit A 214 decodes actual data using decoded authentication data, and supplies the decoded data to the FIFO memory 215. This data is transmitted to the upper apparatus from the FIFO memory 215 (step 1112).

Moreover, this results in that decoded authentication data 309C of the IP-SEC header 300C of FIG. 15 matches authentication data 309 of the IP-SEC header 300 which is not encrypted shown in FIG. 9. Then, IP-SEC decoding processing is normally carried out and data is completely restored to original data.

Figure 16:
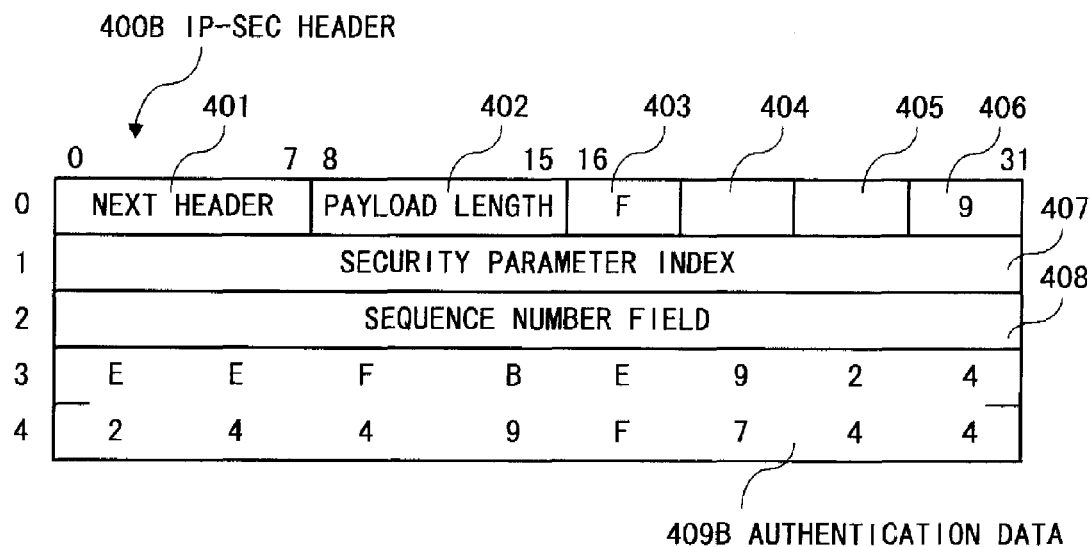
FIG. 16 is a view illustrating one example of a structure of the IP-SEC header before decoding according to the first embodiment of the present invention.
Figure 17:
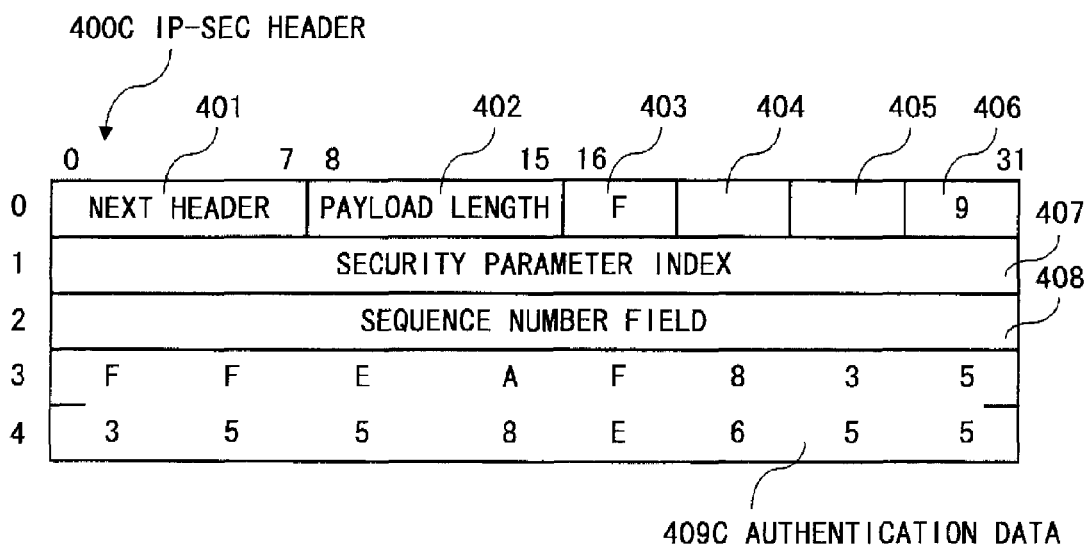
FIG. 17 is a view illustrating one example of a structure of the IP-SEC header after decoding according to the first embodiment of the present invention.

The following will explain a case that data in which encryption keys A and D are valid with reference to FIGS. 16 and 17. This can be compared with examples of FIGS. 11 and 12 at an encrypting time.

In the upper apparatus for the sender and the upper apparatus for the recipient, the use of key D for authentication data decoding circuit D and the value are decided before communication is started. It is assumed that the key D is "EE" in this case.

The upper apparatus of the receiving part notifies the control section 201 of the LAN control apparatus 200 of the use of key D and "EE" of the key D for authentication data decoding circuit D 231 before receiving data. The control section 201 stored the key D to a key D storing portion 231-1 of the authentication data decoding circuit D 231.

The LAN interface transmitting/receiving section 204 stores the received packet to the reception data buffer 213. The authentication data decoding circuit D 231 reads received data from the reception data buffer 213, sequentially (steps 1101-1103).

The authentication data decoding circuit D 231 determines that bit 28 of an authentication data encrypting flag 406 of an IP-SEC header 400B in the reception packet read from the reception data buffer 213 is valid (1). The authentication data decoding circuit D 231 XORs each 8 bits of "EEFBE9242449F744" of authentication data 409B in the same data with the value "EE" of the key D according to this determination. Namely, the authentication data decoding circuit D 231 XORs each 4 bits of authentication data 409B with "E." The authentication data decoding circuit D 231 sets "001507CACAA719AA" obtained thereby to authentication data 409B. The authentication data decoding circuit D 231 transmits the reception packet in which authentication data is updated to the authentication data decoding circuit C 232.

Since bits 29 and 30 of the authentication data encrypting flag 406 of the IP-SEC header 400B are invalid (0), the authentication data decoding circuits C 232 and B 233 do not execute any processing particularly, but send reception data to the authentication data decoding circuits B 233 and A 234, respectively.

The authentication data decoding circuit A 234 receives the reception packet from the authentication data decoding circuit B 233 and determines that bit 31 of the IP-SEC header is valid (1). The authentication data decoding circuit A 234 XORs each 4 bits of authentication data, "001507CACAA719AA", with the value "F" of the key A according to this determination. The authentication data decoding circuit A 234 sets "FFEAF8353558E655" obtained thereby to authentication data 409B. The authentication data decoding circuit A 234 transmits the reception packet in which authentication data 409B is updated to the IP-SEC decoding circuit 214 (steps 1110, 1111).

The IP-SEC decoding circuit 214 performs IP-SEC decoding on the reception packet in which authentication data is thus decoded (the details on the IP-SEC header 400C subjected to authentication data decoding is shown in FIG. 17) in a general processing to restore data to the original data. The IP-SEC decoding circuit 214 transmits decoded reception data to the upper apparatus via the FIFO memory 215 (step 1112).

This results in that decoded authentication data 409C shown in FIG. 17 matches authentication data 409 which is not encrypted shown in FIG. 11, and IP-SEC decoding processing is normally carried out and data is completely restored to original data.

As explained above, in case of encrypting transmission data sent from the upper apparatus, the LAN control apparatuses 100 and 200 of the present embodiment encrypt transmission data using the IP-SEC encrypting circuit 211 and authentication data encrypting circuits A 221 to D 224 in a multiplex manner without using the CPU (control section 201) of the main apparatus. This makes it possible to prevent an increase in loads applied to the CPU with the execution of encryption. Moreover, this makes it difficult for a third person to analyze the content of data immediately in case of that data transmitted to the LAN interface is stolen by the third person during the passage through a LAN network. Accordingly, it is possible to achieve an extremely large effect in prevention of a leak out of secret data (improvement of data security).

An explanation will be next given of a second embodiment of the present invention.

The apparatus configuration of the LAN control apparatus of the second embodiment of the present invention is the same as that of the LAN control apparatus 200 of the first embodiment of FIG. 3. This embodiment exerts ingenuity in handling the respective encryption keys for encryption and decoding.

Figure 18:
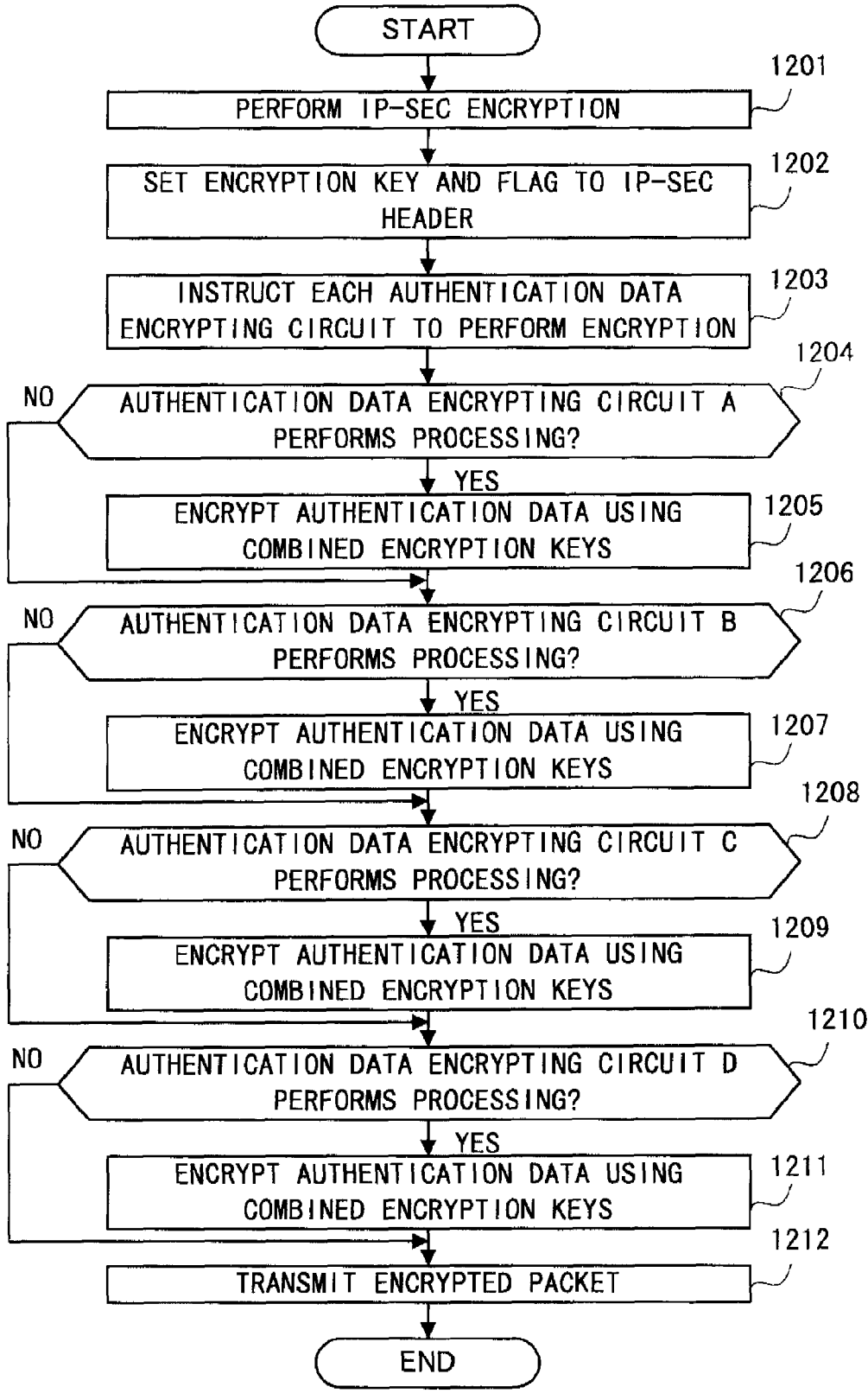
FIG. 18 is a flowchart explaining an operation of a packet transmission according to the first embodiment of the present invention.
Figure 21:
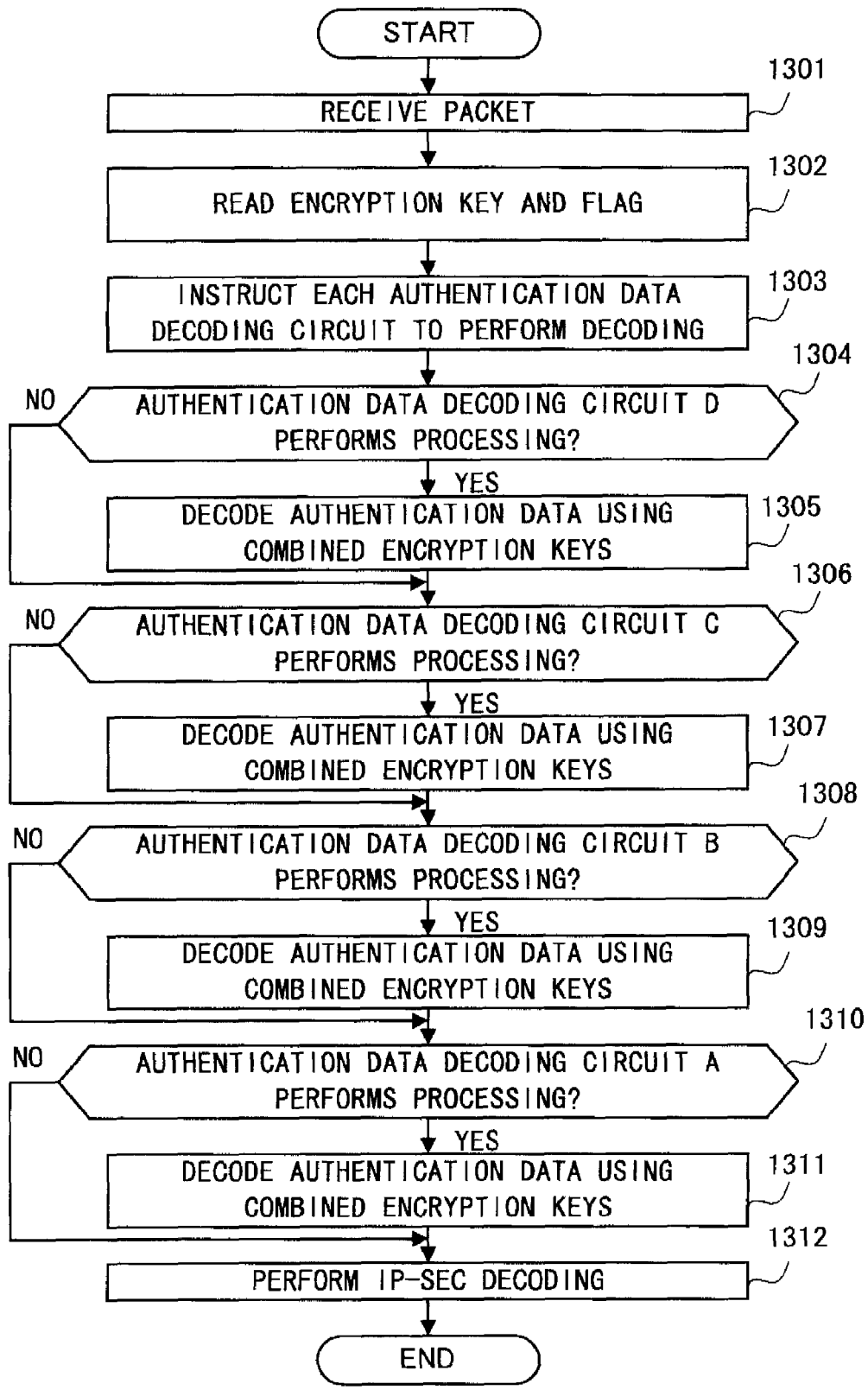
FIG. 21 is a flowchart explaining an operation of a packet reception according to the second embodiment of the present invention.

Regarding data to be used to encrypt authentication data 629, the feature of this embodiment is that the respective encryption keys A/B/C/D are not directly used but combined with one another. FIG. 18 is a flowchart illustrating an encrypting operation at a packet transmitting time according to this embodiment. FIG. 21 is a flowchart explaining a decoding operation at a packet transmitting time according to this embodiment.

Figure 19:
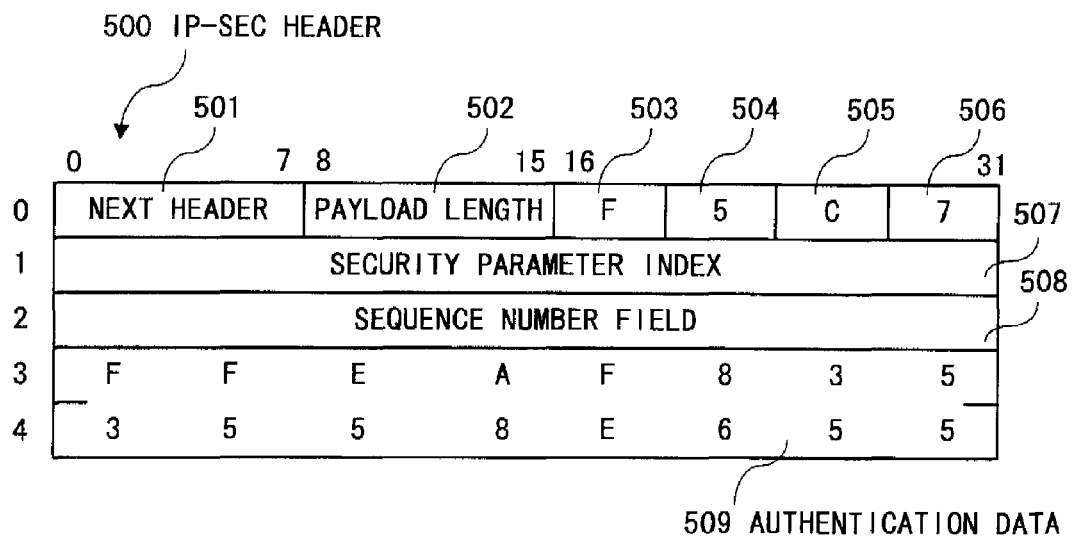
FIG. 19 is a view illustrating one example of a structure of the IP-SEC header before encrypting according to a second embodiment of the present invention.

The encrypting operation will be specifically explained using an example of a case in which three kinds of encryption keys, that is, "F" for key A, "5" for key B and "C" for key C are used in an IP-SEC header 500 shown in FIG. 19.

The control section 201 sets 8-bit "F5" to the authentication data encrypting circuit A 221. The 8-bit "F5" is formed by combining "F" for key A and "5" for key B and is used as encrypting data to be used to encrypt authentication data.

The control section 201 sets 8-bit "5C" to the authentication data encrypting circuit B 222. The 8 bit "5C" is formed by combining "5" for key B and "C" for key C and is used as encrypting data to be used to encrypt authentication data (step 1203).

The control section 201 sets "C7" to the authentication data encrypting circuit C 223. "C7" is formed by combining "C" for key C and "7" for a flag 506 and is used as encrypting data to be used to encrypt authentication data (steps 1201 to 1203).

The authentication data encrypting circuit A 221 XORs 8-bit "F5" where "F" for key A and "5" for key B are combined with each 8 bits of authentication data 509, "FFEAF8353558E655" (XOR "FFEAF8353558E655" and "F5F5F5F5F5F5F5F5" is performed). The authentication data encrypting circuit A 221 sets "0A1F0DC0C0AD13A0" obtained thereby to authentication data 509. The authentication data encrypting circuit A 221 transmits the reception packet in which authentication data is updated to the authentication data encrypting circuit B 222 (steps 1204, 1205).

The authentication data encrypting circuit B 222 XORs set "5C" with each 8 bits of authentication data 509. Then, the authentication data encrypting circuit B 222 sets "5643519C9CF14FFC" obtained thereby to authentication data 509. Then, the authentication data encrypting circuit B 222 transmits transmitting data in which authentication data 509 is updated to the authentication data encrypting circuit C 223 (steps 1206, 1207).

The authentication data encrypting circuit C 223 XORs set "7" with each 8 bits of authentication data 509. Then, the authentication data encrypting circuit C 223 sets "9184965B5B36882B" obtained thereby to authentication data 509. Then, the authentication data encrypting circuit C 223 transmits transmitting data in which authentication data 509 is updated to the authentication data encrypting circuit D 224 (steps 1208, 1209).

Figure 20:
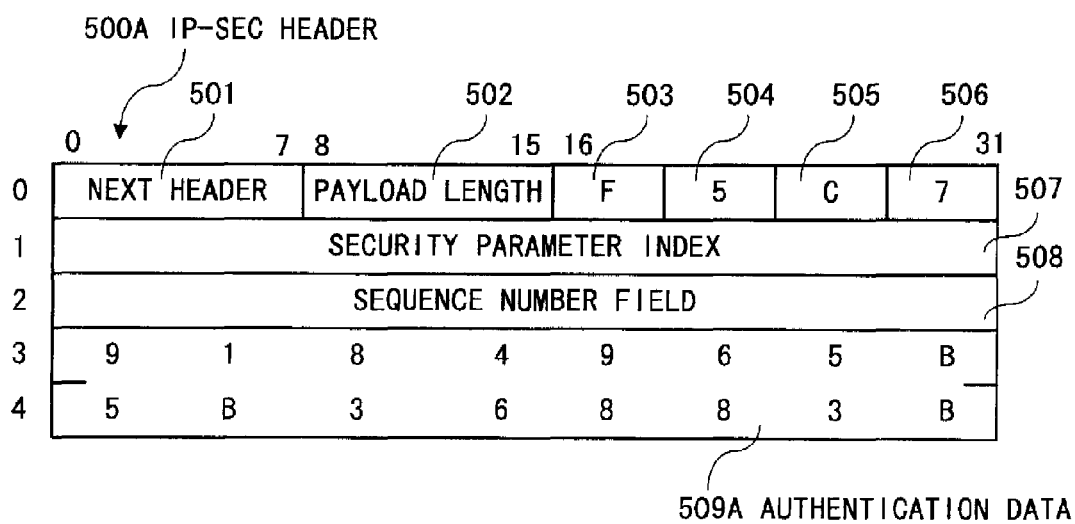
FIG. 20 is a view illustrating one example of the structure of the IP-SEC header after encrypting according to the second embodiment of the present invention.

The authentication data encrypting circuit D 224 transmits this sent data to the transmission data buffer 212 directly since execution of processing is not set by the flag 506 (step 1210). As a result, this encrypted transmission packet is sent (step 1212). FIG. 20 shows an IP-SEC header 500A subjected to this encryption processing.

Figure 22:
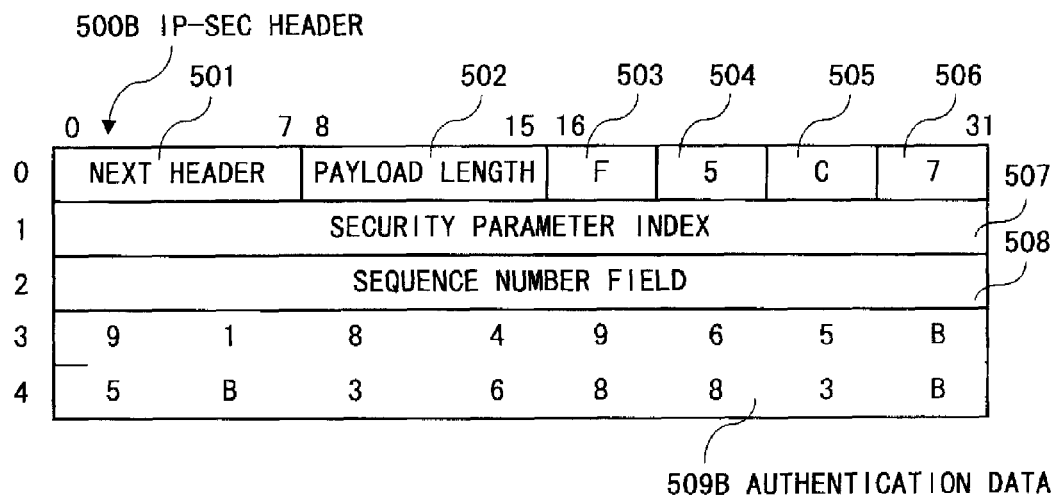
FIG. 22 is a view illustrating one example of a structure of the IP-SEC header before decoding according to the first embodiment of the present invention.

An explanation will be next given of the operation of the LAN control apparatus 200 in the case of receiving the packet having an IP-SEC header 500B configured as in FIG. 22 (the same as the IP-SEC header 500A) with reference to FIG. 21.

First, the authentication data decoding circuit D 231 determines that the flag 506 of IP-SEC header 500B is 7 and bit 28 is invalid (0). Then, the authentication data decoding circuit D 231 sends the reception packet to the authentication data decoding circuit C 232 without executing any special processing particularly.

The authentication data decoding circuit C 232 determines that the flag 506 of IP-SEC header 500B is 7 and bit 29 is valid (1). The authentication data decoding circuit C 232 decodes authentication data 509B using combined data "C7" of key "C" and flag "7." More specifically, the authentication data decoding circuit C 232 XORs each 8 bits of authentication data 509B with combined data "C7" and sets the value obtained thereby to authentication data 509B. Then, the authentication data decoding circuit C 232 sends the reception packet in which authentication data is updated to the authentication data decoding circuit B 233.

The authentication data decoding circuit B 233 determines that the flag 506 of IP-SEC header 500B is 7 and bit 30 is valid (1). The authentication data decoding circuit B 233 decodes authentication data 509B using combined data "5C" of key "5" and flag "C." More specifically, the authentication data decoding circuit B 233 XORs each 8 bits of authentication data 509B with combined data "5C" and sets the value obtained thereby to authentication data 509B. Then, the authentication data decoding circuit B 233 sends the reception packet in which authentication data is updated to the authentication data decoding circuit A 234.

Figure 23:
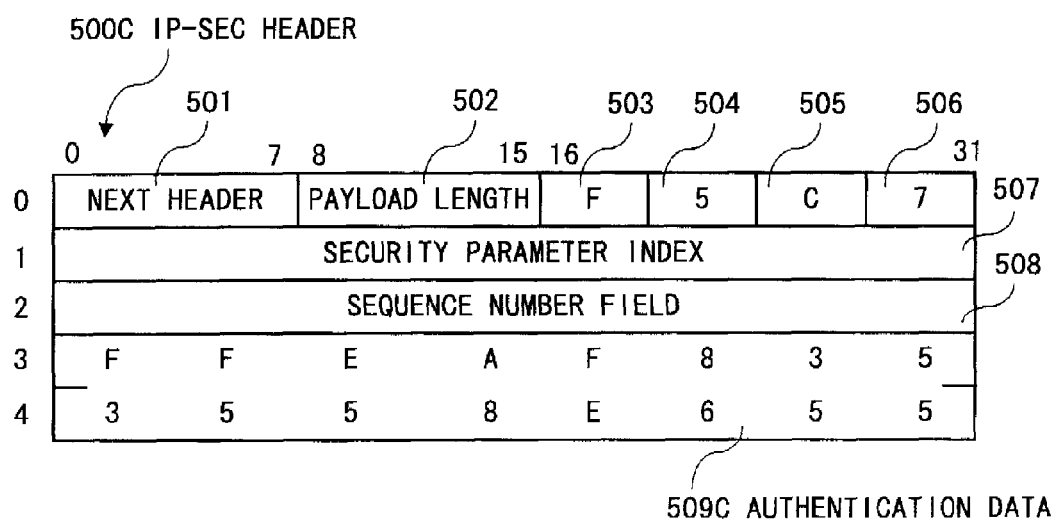
FIG. 23 is a view illustrating one example of a structure of the IP-SEC header after decoding according to the first embodiment of the present invention.

The authentication data decoding circuit A 234 determines that the flag 506 of IP-SEC header 500B is 7 and bit 31 is valid (1). The authentication data decoding circuit A 234 decodes authentication data 509B using combined data "F5" of key "F" and flag "5." More specifically, the authentication data decoding circuit A 234 XORs each 8 bits of authentication data 509B with combined data "F5" and sets the value obtained thereby to authentication data. The IP-SEC header 500C thus decoded is the same as the IP-SEC header 500, which is not subjected to encryption, as show in FIG. 23.

The authentication data decoding circuit A 234 sends the reception packet in which authentication data is updated to the IP-SEC decoding circuit 214.

The IP-SEC decoding circuit 214 decodes actual data using the decoded authentication data to provide to the upper apparatus via the FIFO memory 215.

In addition, regarding the method for combining the encryption keys, any method may be used without being limited to the aforementioned example. For example, there can be considered a method in which keys are combined in the reverse order to the aforementioned method (namely, in the above example, "5F", "C5", "7C"), and a method in which other two keys are combined, e.g., the use of key B+key C as key A.

Moreover, any number of keys to be combined may be possible without being limited to two. Then, according to the number of bits of encrypted data generated by this combination (for example, 8 bits for "5C" and 12 bits for "5C7"), the respective encrypting circuits and decoding circuits perform XOR for each fixed number of bits of authentication data to make it possible to carry out encrypting and decoding.

As mentioned above, according to this embodiment, it is possible to encrypt authentication data 509 in more complicated manner and to achieve improvement of high security even in a case where the same transmission data as FIG. 9 of the first embodiment is used.

Moreover, encryption processing executed by each encrypting circuit based on the encryption keys is not limited to XOR method. Encryption can be executed by adopting the prior art of various encrypting methods other than the XOR method, so that more complicated encrypting method can be adopted. Then, the respective decoding circuits perform decoding using the encryption keys sequentially to make it possible to decode the encrypted authentication data.

Still moreover, according to the present invention, the number of encryption keys and the data length, etc., are not limited to the aforementioned embodiments. For example, there can be employed a mode in which the number of encryption keys is three without using the encryption key D, a mode in which all four encryption keys are recorded in the IP-SEC head without using the flag.

Additionally, in the LAN control apparatuses 100 and 200 of the aforementioned embodiments, the control section 101 achieved the aforementioned functions according to the communication control program 102. The present invention is not limited to this. A mode that achieves the aforementioned functions in view of hardware is also possible in a similar fashion.

The LAN 800 is an example of a network. Other types of networks such as a WAN, the Internet, and so on may be used.

The communication control program 102 may be transferred over the network by embodying a data signal representing the communication control program in a carrier wave.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2002-002704 filed on Jan. 9, 2002 and including specification, claims, drawings and summary. The disclosure of the above Japanese Patent Application is incorporated herein by reference in its entirety.

What is claimed is:

1. A network control apparatus comprising:

first encrypting means for receiving a transmitting packet from an upper apparatus to perform IP-SEC encryption on the transmitting packet; and second encrypting means for encrypting header data that is used to decode the transmission packet subjected to IP-SEC encryption and is generated at an IP-SEC encrypting time in a predetermined method, wherein the header data is authentication data in an IP-SEC header of the transmission packet, and information to be used to decode the encrypted authentication data is recorded onto a predetermined unused portion of the IP-SEC header of the transmission packet.

2. A network control apparatus comprising:

first encrypting means for receiving a transmitting packet from an upper apparatus to perform IP-SEC encryption on the transmitting packet; and second encrypting means for encrypting header data that is used to decode the transmission packet subjected to IP-SEC encryption and is generated at an IP-SEC encrypting time in a predetermined method, wherein the header data is authentication data in an IP-SEC header of the transmission packet, and information to be used to decode the encrypted authentication data is recorded between a recording area of a payload length and a recording area of a security parameter index in the IP-SEC header of the transmission packet.

3. A network control apparatus comprising:

first encrypting means for receiving a transmitting packet from an upper apparatus to perform IP-SEC encryption on the transmitting packet; and second encrypting means for encrypting header data that is used to decode the transmission packet subjected to IP-SEC encryption and is generated at an IP-SEC encrypting time in a predetermined method, wherein the header data is authentication data in an IP-SEC header of the transmission packet, and further comprising:

first decoding means for decoding the encrypted authentication data of the received encrypted transmission packet using information to be used to decode the encrypted authentication data recorded in the IP-SEC header of the transmission packet;

second decoding means for decoding the received encrypted transmission packet using the authentication data decoded by said first decoding circuit; and means for recording a plurality of encryption keys, serving as information to be used to decode the encrypted authentication data, into the IP-SEC header of the transmission packet.

4. The network control apparatus according to claim 3, wherein a flag that designates how each encryption key is used to decode the encrypted authentication data is included in information to be used to decode the authentication data.

5. The network control apparatus according to claim 3, wherein a part of the respective encryption keys to be used to decode the encrypted authentication data is notified to a recipient's terminal from a sender's terminal for the encrypted transmission packet, and the encrypted authentication data of the received encrypted transmission packet is decoded using the notified encryption key and other encryption keys recorded in the IP-SEC header of the encrypted received transmission packet at the recipient's terminal for the encrypted transmission packet.

6. The network control apparatus according to claim 3, wherein each of the encryption keys is formed of n-bit data, said second encrypting means XOR each n-bits of the authentication data with each encryption key sequentially to encrypt the authentication data, and said first decoding circuit XOR each n-bits of the authentication data of the encrypted transmission packet received with each encryption key to decode the authentication data.

7. The network control apparatus according to claim 3, wherein each of the encryption keys is formed of n-bit data, said second encrypting means XOR each k.n bits of the authentication data with k.n-bit data obtained by combining k encryption keys sequentially to encrypt the authentication data, and said first decoding circuit XOR each k.n bits of the authentication data of the received transmission packet with k.n-bit data obtained by combining k encryption keys sequentially to decode the authentication data.

* * * * *